(12) United States Patent
Foxlee et al.

(10) Patent No.: US 9,750,372 B2
(45) Date of Patent: Sep. 5, 2017

(54) TRI-BLADE ASSEMBLY FOR BLENDER

(71) Applicant: Breville Pty Limited, Botany NSW (AU)

(72) Inventors: Brendan John Foxlee, Earlwood (AU); Khon Thai, Campsie (AU)

(73) Assignee: Breville Pty Limited, Alexandria, NSW (AU)

( * ) Notice: Subject to any disclaimer, the term of this patent is extended or adjusted under 35 U.S.C. 154(b) by 484 days.

(21) Appl. No.: 14/378,968

(22) PCT Filed: Feb. 17, 2013

(86) PCT No.: PCT/AU2013/000139
§ 371 (c)(1),
(2) Date: Aug. 14, 2014

(87) PCT Pub. No.: WO2013/120145
PCT Pub. Date: Aug. 22, 2013

(65) Prior Publication Data
US 2015/0023130 A1    Jan. 22, 2015

(30) Foreign Application Priority Data

Feb. 17, 2012 (AU) ................................ 2012900567

(51) Int. Cl.
| | |
|---|---|
| *A47J 43/00* | (2006.01) |
| *A47J 43/046* | (2006.01) |
| *A47J 43/07* | (2006.01) |
| *A47J 43/08* | (2006.01) |

(52) U.S. Cl.
CPC ......... *A47J 43/046* (2013.01); *A47J 43/0722* (2013.01); *A47J 43/085* (2013.01)

(58) Field of Classification Search
CPC ...... A47J 43/07; A47J 43/046; A47J 43/0722; A47J 43/085
USPC .......................................... 366/205
See application file for complete search history.

(56) References Cited

U.S. PATENT DOCUMENTS

| | | | | |
|---|---|---|---|---|
| 6,666,574 | B1 * | 12/2003 | Pryor ................... | A47J 43/0722 241/282.1 |
| 8,042,990 | B2 * | 10/2011 | Pryor, Jr. ............ | A47J 43/0766 366/197 |

* cited by examiner

*Primary Examiner* — Tony G Soohoo
*Assistant Examiner* — Anshu Bhatia
(74) *Attorney, Agent, or Firm* — Molins & Co. Pty. Ltd.

(57) ABSTRACT

A jug body having a through opening for receiving a blade assembly, the opening extending through a hub formed on an underside of the jug; the blade assembly having a bearing case within which is mounted bearings for supporting a shaft; the bearing case having a flange at one end and having threads at an opposite end, the threads protruding from a lower surface of the hub; the threads cooperating with a threaded nut that draws the flange into engagement with the jug; the lower surface of the hub and the nut being capped by a cover through which protrudes the shaft; a lower end of the shaft having attached to it, a coupling.

15 Claims, 16 Drawing Sheets

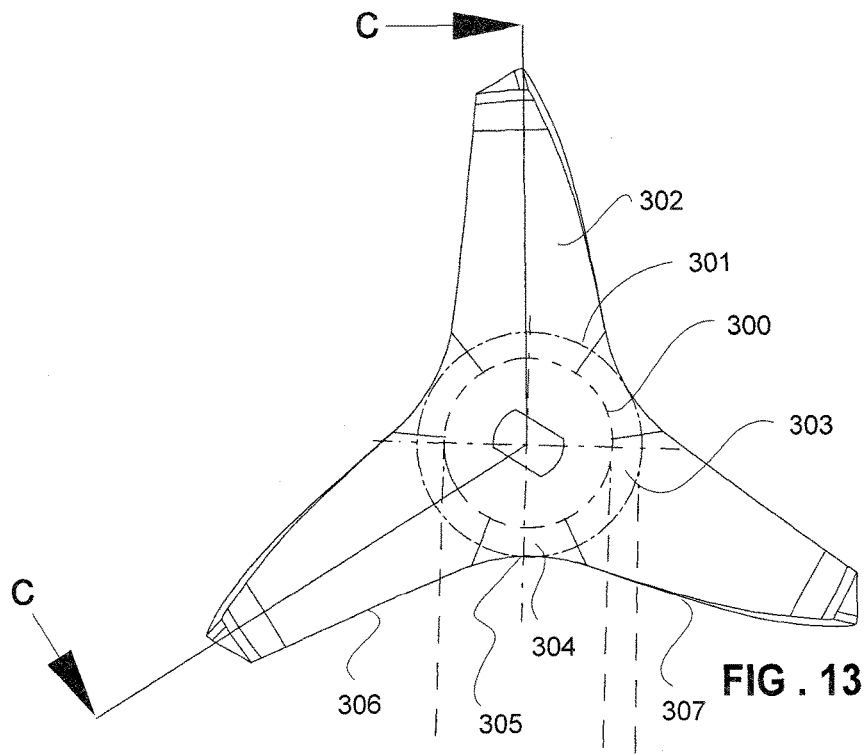
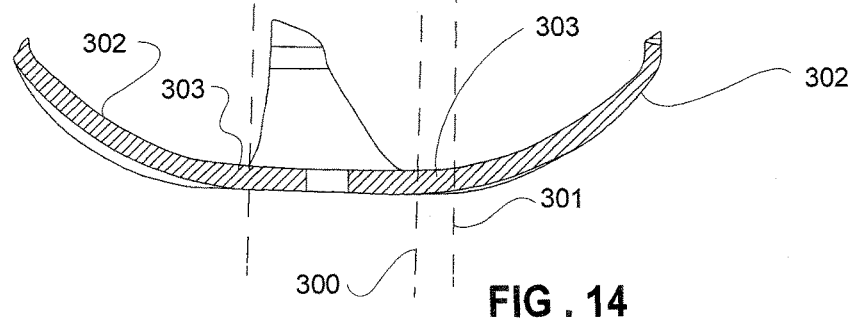

TRI-BLADE ASSEMBLY FOR BLENDER

FIELD OF THE INVENTION

The invention relates to blenders and more particularly to a blade assembly for a blender.

BACKGROUND OF THE INVENTION

Blenders are used in domestic and commercial environments for mixing, liquefying, blending and crushing ice. A blender comprises a base that contains a motor and a jug that fits onto the base. The jug has a blade assembly that is retained by the jug and driven by the motor in the base. The design of the blade assembly contributes significantly to the performance of the blender. The performance, durability and servicing of the blades is enhanced by the bearing case (or blade assembly hub), bearings and other components that are used to affix the blades to the interior of the jug.

OBJECTS AND SUMMARY OF THE INVENTION

It is an object of the invention to provide a blade assembly that provides a reasonable alternative to prior art blade assemblies.

It is another object of the invention to provide a blade assembly having three main or sweeper blades and three optional upper blades.

It is yet another object of the invention to provide a threaded hub and means for retaining it onto a jug.

BRIEF DESCRIPTION OF THE DRAWING FIGURES

In order that the invention be better understood, reference is now made to the following drawing figures in which.

Figure 9:
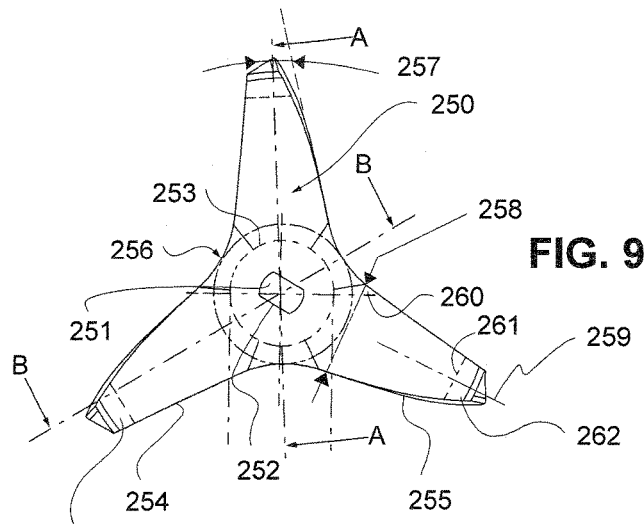

FIG. 9 FIG. 9 is a plan view of a three bladed main blade for a blender.

Figure 10:
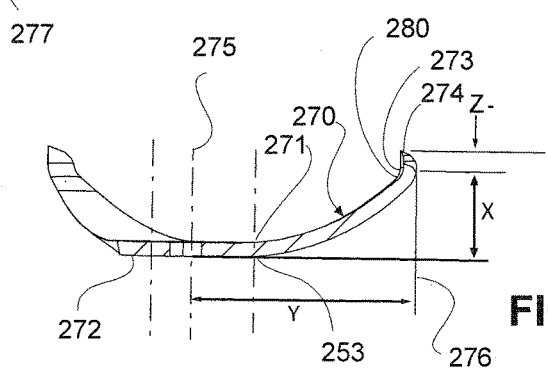

FIG. 10 is a cross section through line A-A of FIG. 9.

Figure 11:
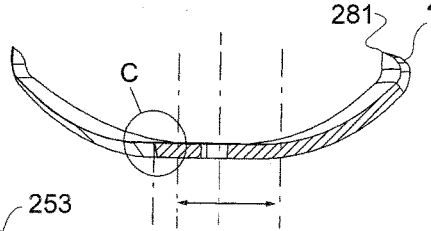

FIG. 11 is a cross section through line B-B of FIG. 9.

Figure 12:
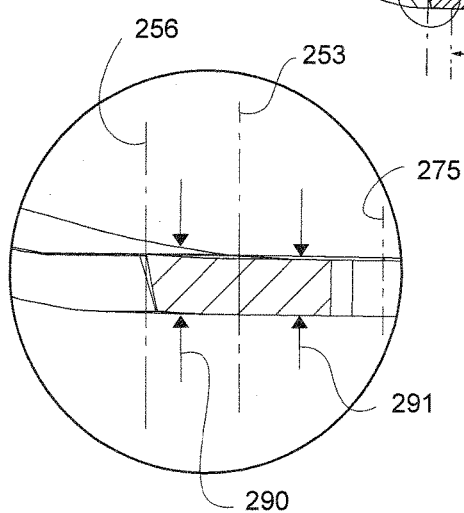

FIG. 12 is an enlargement of detail C shown in FIG. 11.

FIG. 13 is a top plan view of a three bladed sweeper blade, in accordance with the teachings of the invention.

FIG. 14 is a cross section through line C-C of FIG. 13.

Figure 15:
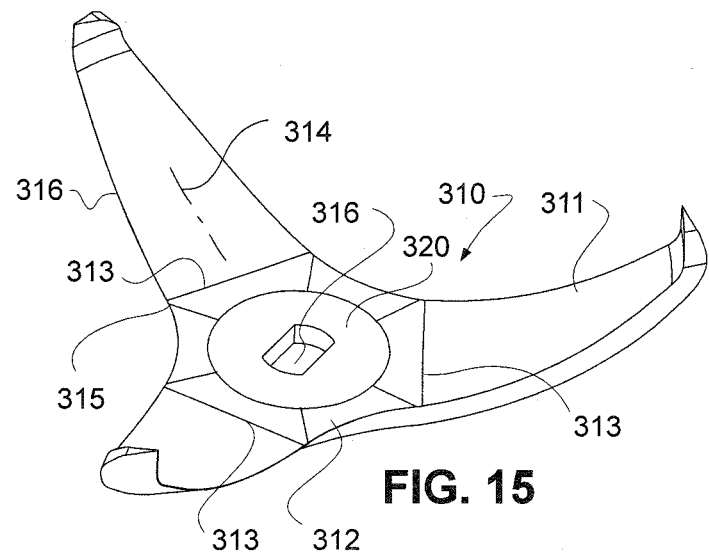

FIG. 15 is a perspective view of a three bladed sweeper blade in accordance with the teachings of the invention.

Figure 16:
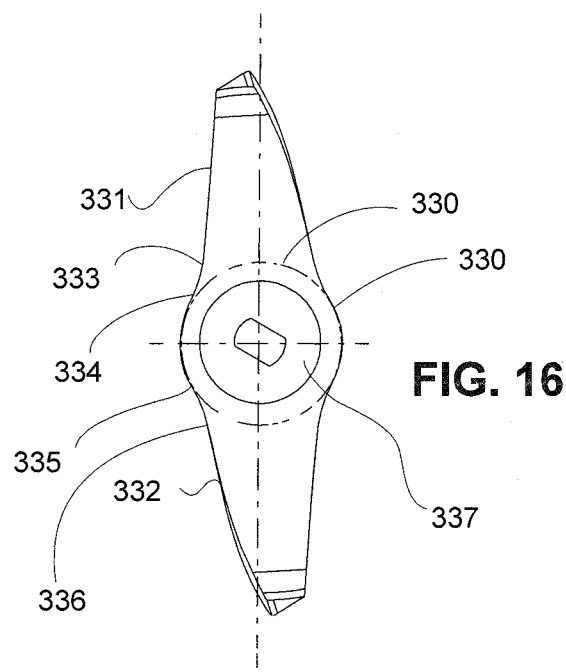

FIG. 16 is a top plan view of a two bladed sweeper blade in accordance with the teachings of the invention.

BEST MODE AND OTHER EMBODIMENTS

Figure 1:
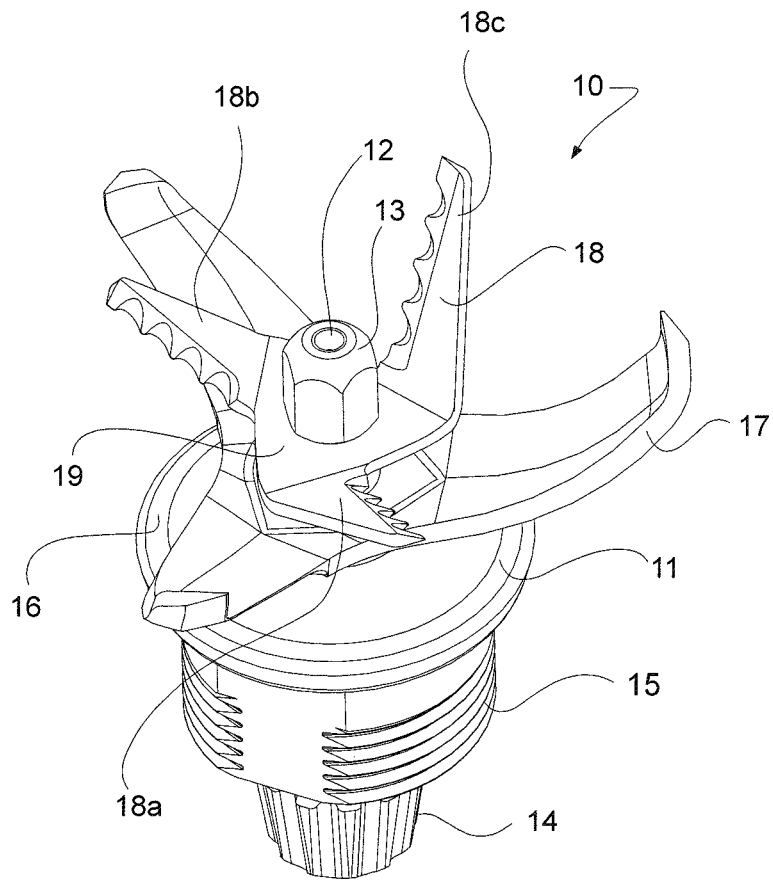
FIG. 1 is a perspective view of a blade assembly and its bearing case or hub having three main or sweeper blades and three upper blades.

As shown in FIG. 1, a blade assembly 10 for a blender and the shaft 12 that retains the blade assembly are supported by a central bearing case or hub 11. The vertical shaft 12 is supported by two spaced apart ball bearing sets contained within the case or hub 11. The uppermost portion of the shaft 12 retains a nut 13 that is used to retain the blade assembly. An opposite end of the shaft 12 supports a male coupling component 14 that is driven by a cooperating coupling on the base of the blender. The hub 11 may optionally be provided with threads 15. Thus, a nut may be used to draw the upper flange 16 of the bearing case or hub into a sealing engagement with the inside or upper surface of the floor of the jug.

The blade assembly further comprises three main or sweeper blades 17 formed from a single blank or body and spaced above them, three shorter upper blades 18 also on a single blank. In preferred embodiments, the main blades are spaced 120 degrees apart, the upper blades are cold pressed or deep drawn in stages to a final shape and spaced 120 degrees apart. The angular offset between the main and the preferably shorter upper blades is, for example, 60 degrees.

The upper blades 18 are preferably three in number. The upper blades 18 are formed on a single blank or body having a common central area 19. Each of the three upper blades 18 shorter than any of the three main blades 17. The upper blades preferably have serrated leading edges. Each blade is angled differently with respect to the horizontal. In preferred embodiments, a first of the upper blades 18A is angled at 22 degrees. A second of the main blades 18B is angled at 44 degrees. A third of the upper blades 18C is angled at 66 degrees. However, other angles may be used.

The three main or sweeper blades 17 are also formed from a single blank having a common hub area through which the shaft 12 passes. The main blades may optionally be serrated.

Figure 2A:
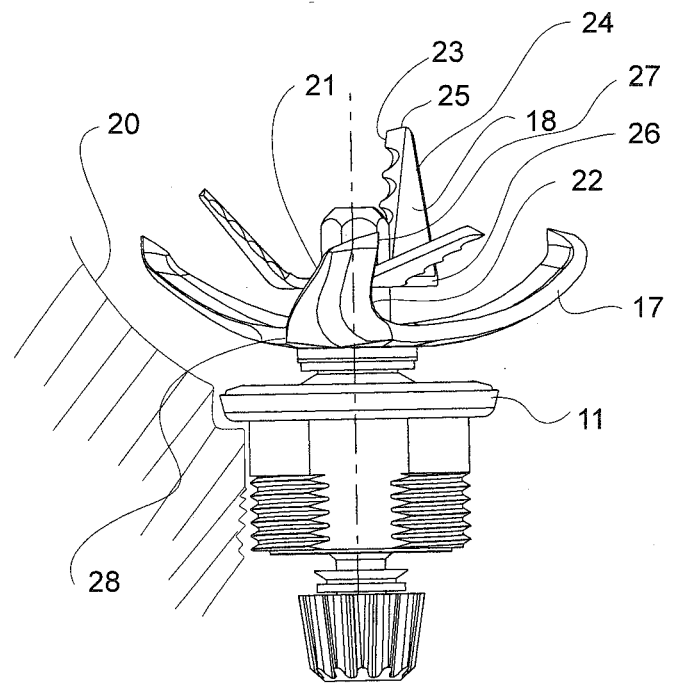
FIG. 2A is a side elevation of the blade assembly with hub depicted in FIG. 1.

As shown in FIG. 2A, the main or sweeper blades 17 are spaced above the flange 11. The main blades 17 have an upward bend or smooth curvature that corresponds with the curvature of the interior of the jug 20. In this embodiment, the main blades 17 are not serrated but, the upper blades 18 are serrated. In this embodiment, both the leading edge 21 and the trailing edge 22 of each main blade 17 are swept forward, that is, into or toward the direction of rotation. The upper blades 18 have a serrated and generally linear leading edge 23 and a straight trailing edge 24. The blades taper in chord (or width) form a minimum chord at the tip 25 to a maximum chord toward the root 26 of each of the upper blades 18. The chord of the main blade 17 also increases form a minimum at the tip 27 to a maximum chord at or toward the root 28.

Figure 2B:
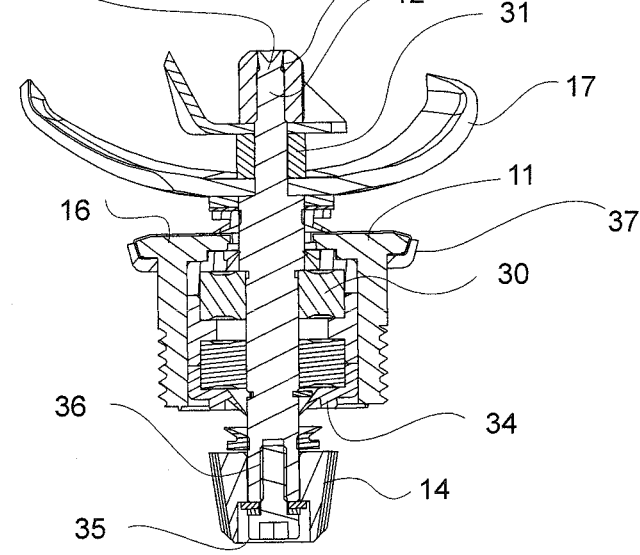
FIG. 2B is a cross section through the blade assembly and hub depicted in FIG. 2A.

As shown in FIG. 2B, the central and vertical shaft 12 is supported by bearings 30 located within the hub 11. The shaft 12 passes through a cylindrical spacer 31 that locates the upper blades 18 a fixed distance above the main blades 17. Note that in place of a threaded fastener, a plastic or rivet-like deformation of the upper tip 32 of the shaft may be used to retain a blade keeper 33 that maintains the upper blades 18 in contact with the top of the spacer 31. A seal 34 at the lower terminal end of the hub 11 prevents the ingress of food and dirt into the interior of the hub. The coupling 14 is retained by a threaded fastener 35 that engages a cooperating blind bore 36 formed in the lower end of the shaft 12. An "L" shaped seal 37 surrounds the circumference of the flange 16 and prevents the contents of the jug from entering the space between the hub 11 and the jug.

Figure 2C:
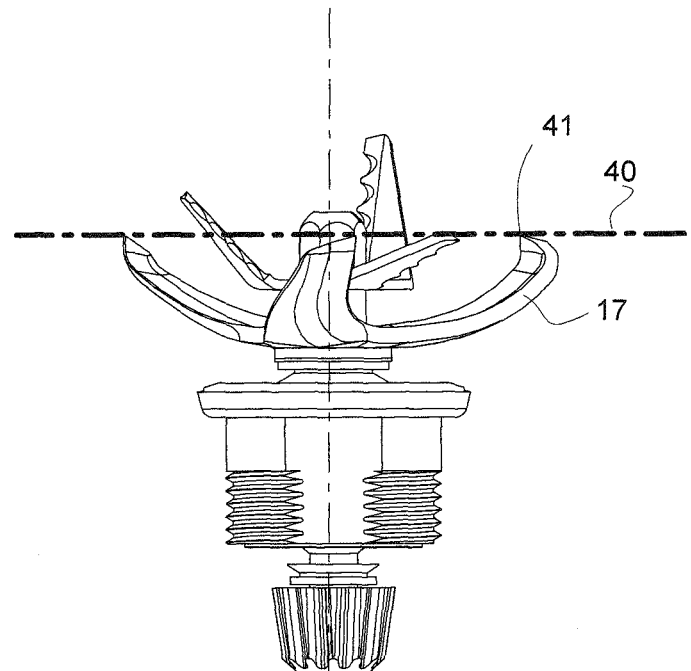
FIG. 2C is a side elevation of a blade assembly and hub.
Figure 2D:
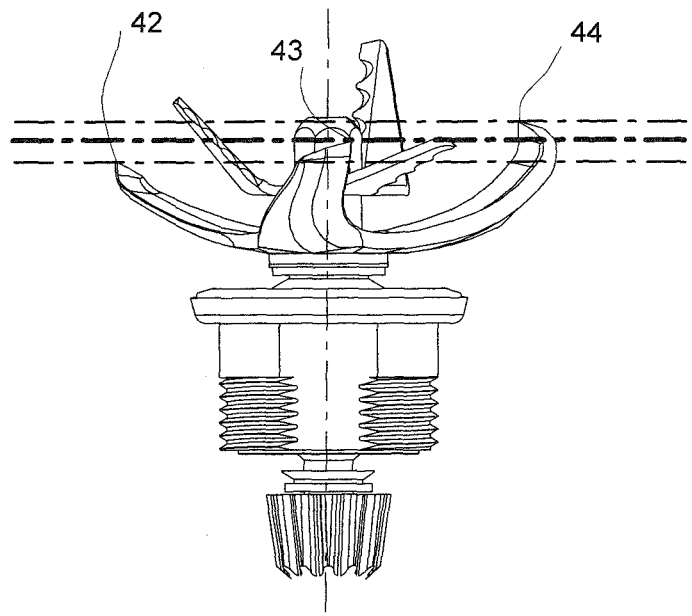
FIG. 2D is another embodiment of the assembly depicted in FIG. 2C.

As shown in FIG. 2C, the vertical height or vertical elevation 40 of the tips 41 of the three main blades 17 may be the same. However, in an alternate embodiment, and as shown in the FIG. 2D, the vertical elevation of each tip 42, 43, 44 may be different. This provides increased tip exposure to the contents of the jug, fewer dead zones, and thereby potentially increases the performance of the blades.

Figure 2E:
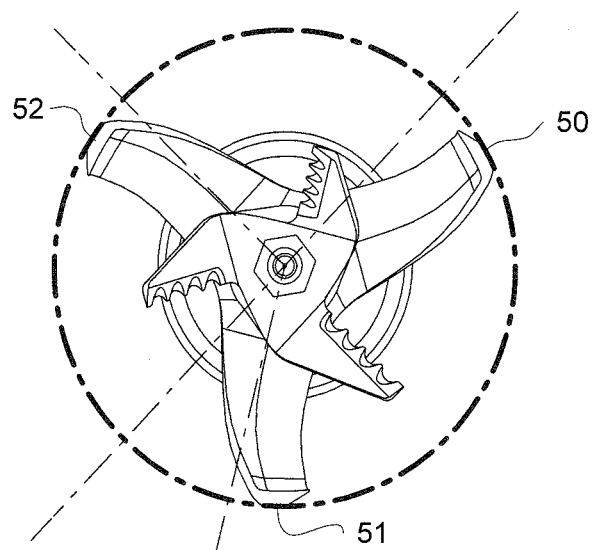
FIG. 2E is a plan view of a blade assembly.
Figure 2F:
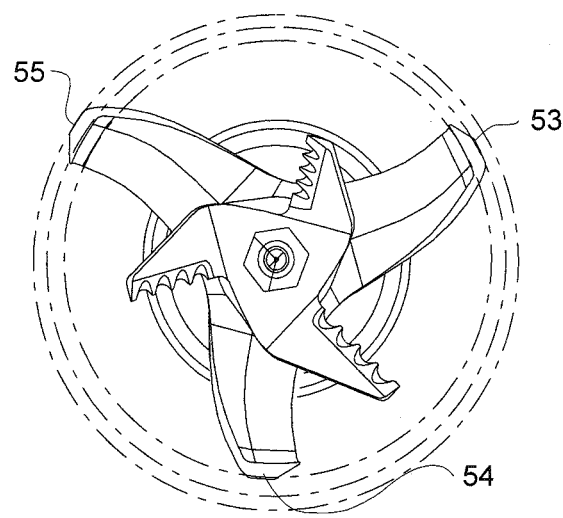
FIG. 2F is a plan view of an alternate embodiment of the assembly depicted in FIG. 2E.

As illustrated in FIGS. 2E and 2F, (and conjunction with either of the embodiments depicted in FIGS. 2C and 2D) the radius (from the centreline of the shaft 12) of each of the tips 50, 51, 52 of the main blades can be the same. In alternate embodiments, the effective radius of the blade tips 53, 54 and 55 may be different. In these examples the leading edges are concave or inwardly curved. The trailing edge is swept or convex.

Figure 2G:
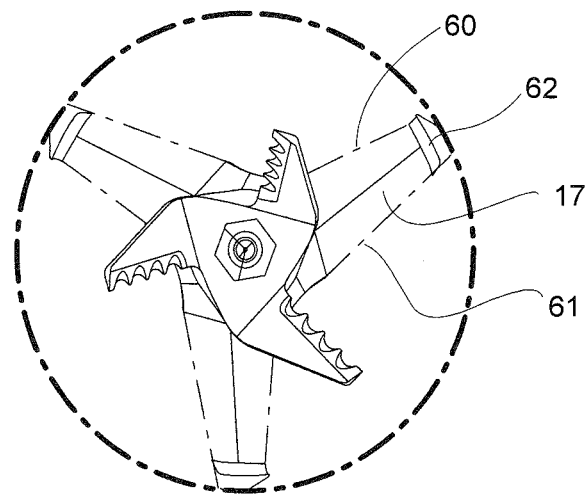
FIG. 2G is a plan view of a blade assembly with width tapered main blades.
Figure 2H:
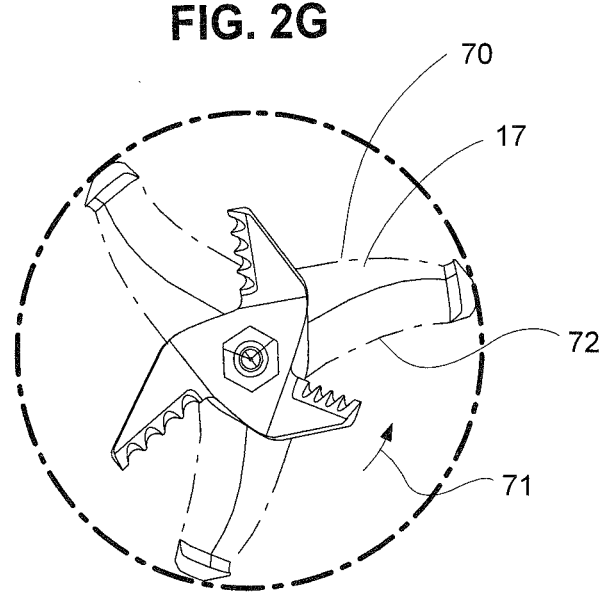
FIG. 2H is a plan view of a blade assembly with backward swept main blades.
Figures 3A, 3B, 3C:
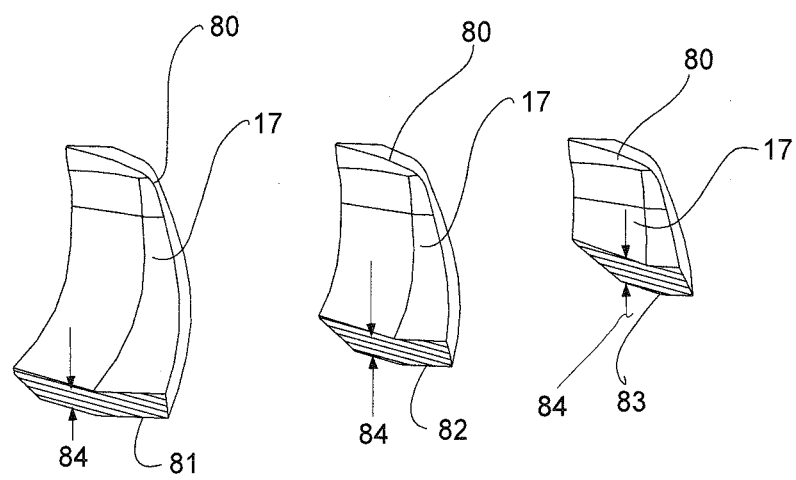
FIGS. 3A-3C are perspective views of portions, cross sectioned vertically to demonstrate increasing thickness in the vertical plane when approaching the blade tip.

As shown in FIG. 2G, the main blades 17 may have a straight leading edge 60 and/or a straight or angled trailing edge 61. In this example, the blades are curved upwardly as suggested by FIG. 1 and have upwardly turned blade tips 62, also as suggested by FIGS. 1, 2A and 2B. In alternate embodiments, the main blades 17 are swept backward, having a convex curvature 70 in the direction of rotation 71 and a concave trailing edge 72. As shown in FIGS. 3A, 3B and 3C, the main blades 17 have a tapering width or chord. The narrowest portion of the chord occurs toward the tip 80 of each main blade 17. As illustrated in these Figures, the upward curvature (of the preferred embodiment) from the root toward the tip 80 results in an effective increase in true vertical cross sectional thickness 84 as the true vertical cross section approaches the blade tip.

Figure 2I:
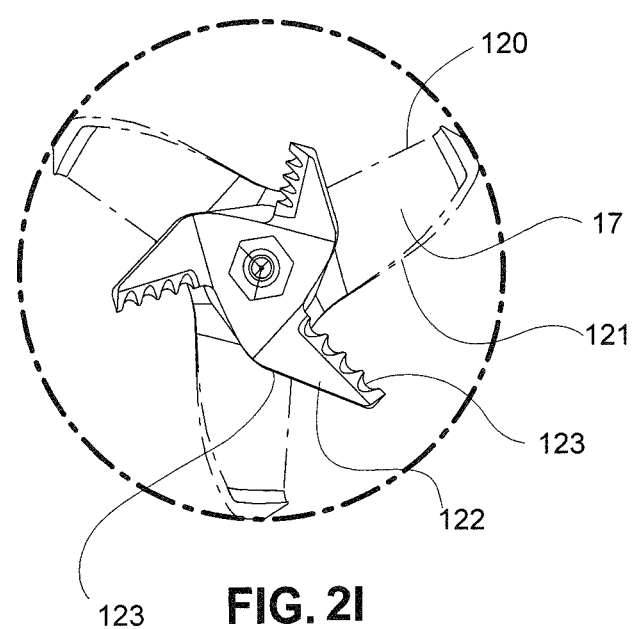
FIG. 2I is a plan view of a blade assembly with main blades having a straight leading edge and a swept trailing edge.

In the particularly preferred embodiment of FIG. 2I, each of the three main blades has a straight leading edge 120 and a swept back trailing edge 121. Each of the three upper blades 122 have a straight and serrated leading edge 123 and a straight, swept or angled trailing edge 123.

In some embodiments the inclination of each of the three upper blades is different. See FIGS. 1-2D.

In preferred embodiments, the upward or vertical curvature of the main blades is accomplished by cold pressing or deep draw pressing.

Figure 4:
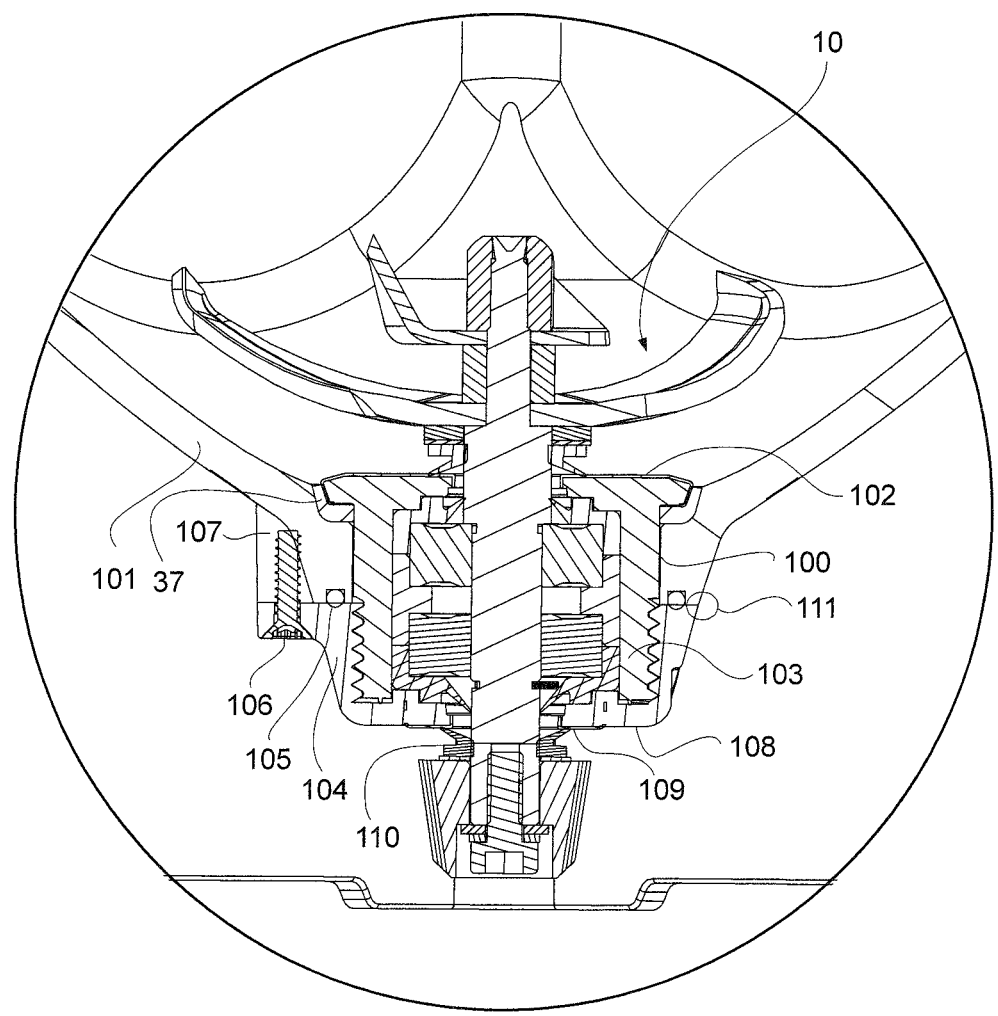
FIG. 4 is a cross section of a blade assembly and polymeric fixing nut.

As shown in FIG. 4, the blade assembly 10 is retained in an opening 100 that is located at the bottom of the jug 101. The flange 102 of the bearing case or hub 148 forms a sealing engagement with the "L" shaped seal 37. The threaded lower portion 103 of the bearing case engages the co-operating threads of a fixing nut 104 in preferred embodiments, the fixing nut 104 is fabricated from the same material as the jug 101. The underside of the jug's flat fixing surface comprises a circular groove for retaining an O-ring 105. The O-ring 105 seals against the flat upper surface of the fixing nut 104. To prevent the fixing nut 104 from inadvertently rotating, the fixing nut may be provided with a radial extension through which a fastener 106 may be inserted and threaded into a co-operating boss 107 formed into the underside of the jug 101. The underside 108 of the fixing nut further comprises a through opening 109 through which the shaft extends and around which the shaft is sealed by a "V" seal 110. The provision of a replaceable, threaded fixing nut 104 improves the reliability of the O-ring's seal 105 by providing enhanced uniformity of compression. The arrangement also minimises the number of mechanical screws generally need to retain the jug's fixing nut. Although a single screw 106 is depicted in FIG. 4, the polymeric fixing nut may also be affixed by heat staking or ultrasonic welding to the underside of the jug. The arrangement also allows the blade assembly and the fixing of it to be re-worked during manufacturing with less effort when compared with some other prior art solutions. The trapping of food is minimised because the outer surface of the fixing nut is smoothly blended with the shape of the jug as illustrated in the intersection between the two parts 111.

Figure 4A:
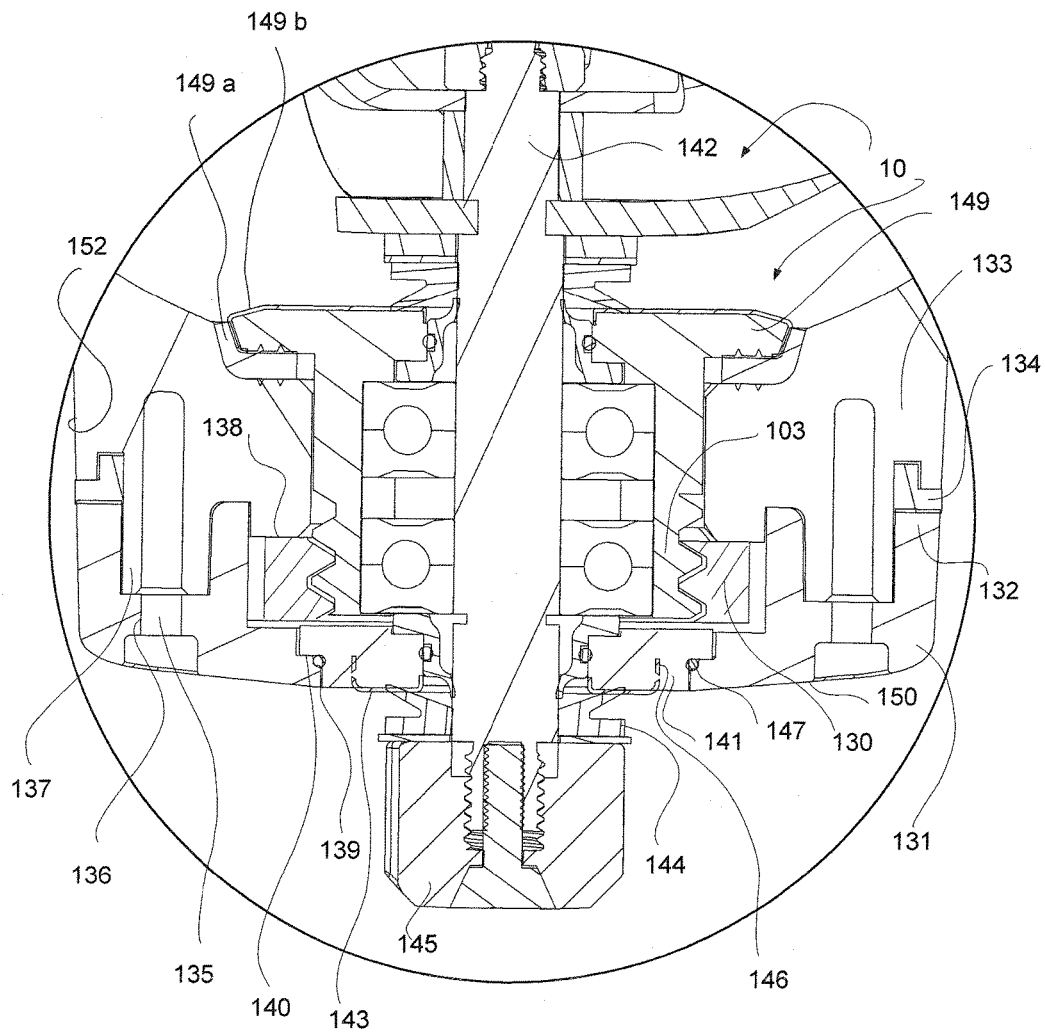
FIG. 4A is a cross section of a alternate method of retaining the blades utilising a threaded hub or bearing case and retaining nut that are protected by a cover.

An alternate to the example depicted in FIG. 4 is illustrated in FIG. 4A. In this example, the threaded portion of the bearing case or hub 103, being at an opposite end of the bearing case to the upper flange, is retained by a threaded nut 130 that is not affixed to the jug by retaining screws. Instead, the threaded nut 130 (and the hub 11) are located beneath and protected by a hub cover 131. A part of the threaded end protrudes from a lower surface of the jug's hub so that the threads can be engaged by the nut 130. The nut 130 draws the flange 149 is not engagement with the jug and preferably the seal 149a located between the flange and an interior of the jug. The "L" shaped seal is contained within a circular recess in the floor of the jug as is a partial thickness of the flange. The outer rim of the flange 149b is chamferred to make the transition between the flange and the jug's floor smoother. The upper edge 132 of the hub cover 131 is sealed with respect to an adjacent portion of the jug 133 by a "L" shaped elastomeric seal 134. The hub cover 131 forms a protective and easy to clean cap over the hub and is optionally retained onto the jug by longitudinal or vertically oriented, threaded (or other) fasteners 135. The fasteners 35 are located radially inward of the circumferential seal 134. The hub cover 131 has a circumferential groove 136 that cooperates with a circumferential ring 137 formed on an underside of the jug. The jug has a landing 138 for the threaded nut 130 that is radially inward of the ring 137. The hub cover 131 has an opening 139 featuring a step 140 that is used to retain an optionally separate insert 141. The insert 141 has a central opening for receiving the blade shaft 142. The insert also features an over-moulded metal plate 143 that defines at least a portion of the lowermost surface of the insert 141. The over-moulded (or separately applied) metal plate 143 acts as a covering and thus contact surface for the hp seal 144 that is interposed between the insert 141 and the male coupling component 145 that is attached to a lower end of the shaft 142. In preferred embodiments, the plate 143 has an outer rim 146 that is moulded into or at least partially embedded into the insert 141. The circumferential edge of the insert is stepped to cooperate with the step 140 formed into the cover. The outer surface of the insert is flush with the outer surface of the cover. In some embodiments, an o-ring seal 147 is interposed between the insert 141 and the cover 131. The cover 131 presents a slightly domed under surface 150 and its outer, cylindrical circumference is flush with the outer surface 152 of the lower portion of the jug 133. Optionally, the cover 131 is made from the same polymer as the jug.

Figure 5:
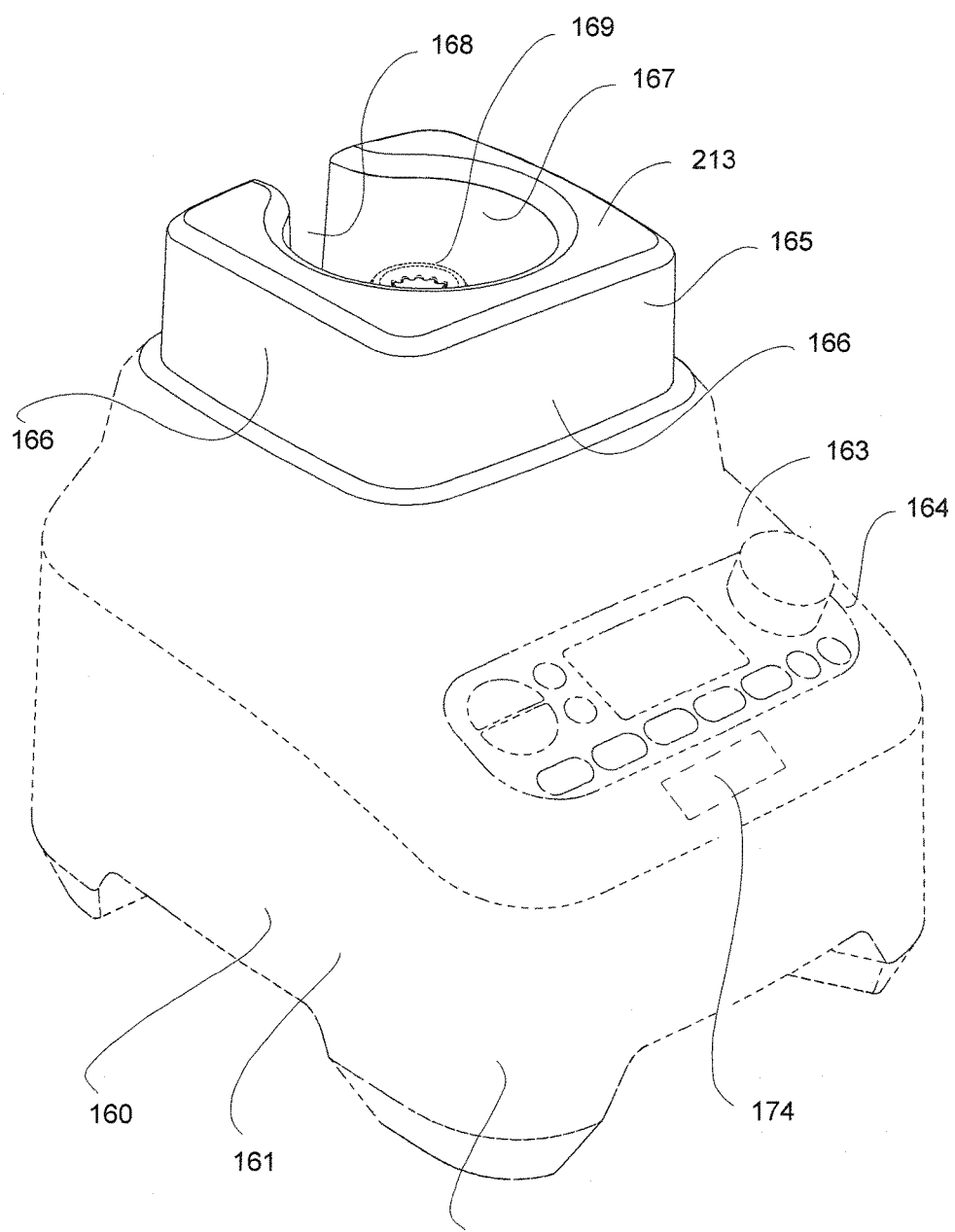
FIG. 5 is a perspective view of a blender base having a square, upright neck and circular throat.

As shown in FIG. 5, a base 160 for a blender has four relatively flat sides 161 interconnected by rounded corners 162. The flat sides 161 surround an upwardly directed surface 163 that carries the user interface 164. An uppermost part of the base 160 comprises an upright neck 165. In this example, the neck 165 has four relatively flat side 166 and within the confines of the flat sides, a generally circular neck 167. The cavity formed by the neck 167 may have a vertical gap or slot 168 for allowing the contents of the neck 167 to drain. The female coupling 169 associated with the blender's motor is located within the neck 167. The purpose of the neck 165 is to support and orient the blender's jug.

Figure 6:
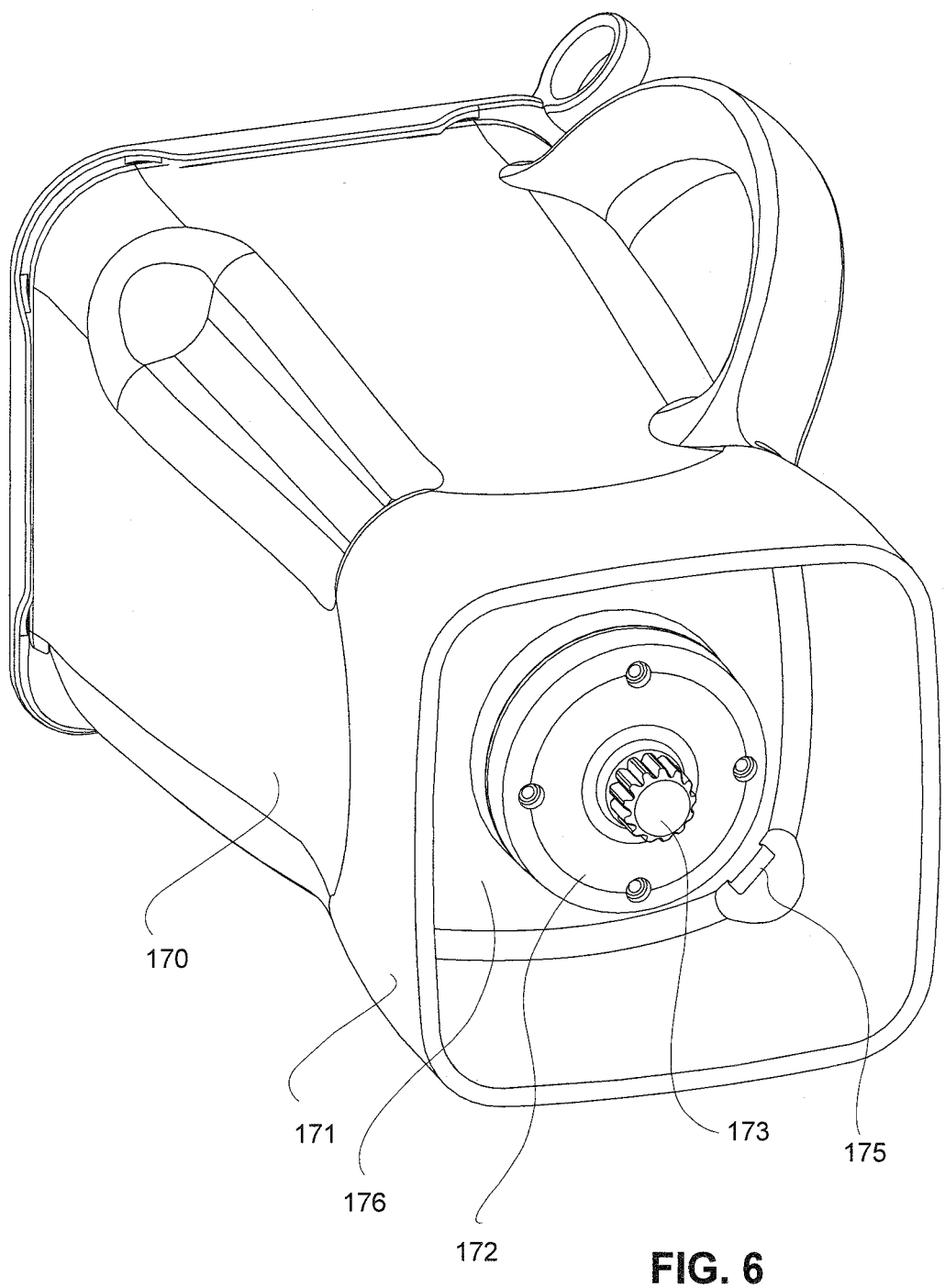
FIG. 6 is an underside perspective view of a jug with a square collar or skirt within which is located the jug's hub.

As shown in FIG. 6, the jug 170 has a downwardly extending skirt or collar 171 that fits over and conforms with the shape of the neck 165 depicted in FIG. 5. The jug's hub 172 is located within the collar 171. The male coupling 170 associated with the jug's blade assembly is central to both the hub 172 and the collar 171. Because the collar 171 and neck 165 each have four sides, the jug 170 is capable of four different orientations with respect to the base. Apart from the hub 172 and the opening 175, the interior of the collar and the surface of the underside of the jug 176 are unobstructed by ribs or structures that impede easy cleaning.

In some embodiments of the invention, it is useful for the blender's microprocessor 174 to be able to act on information relating to the presence of absence of the jug 170 on the base 160.

Figure 7:
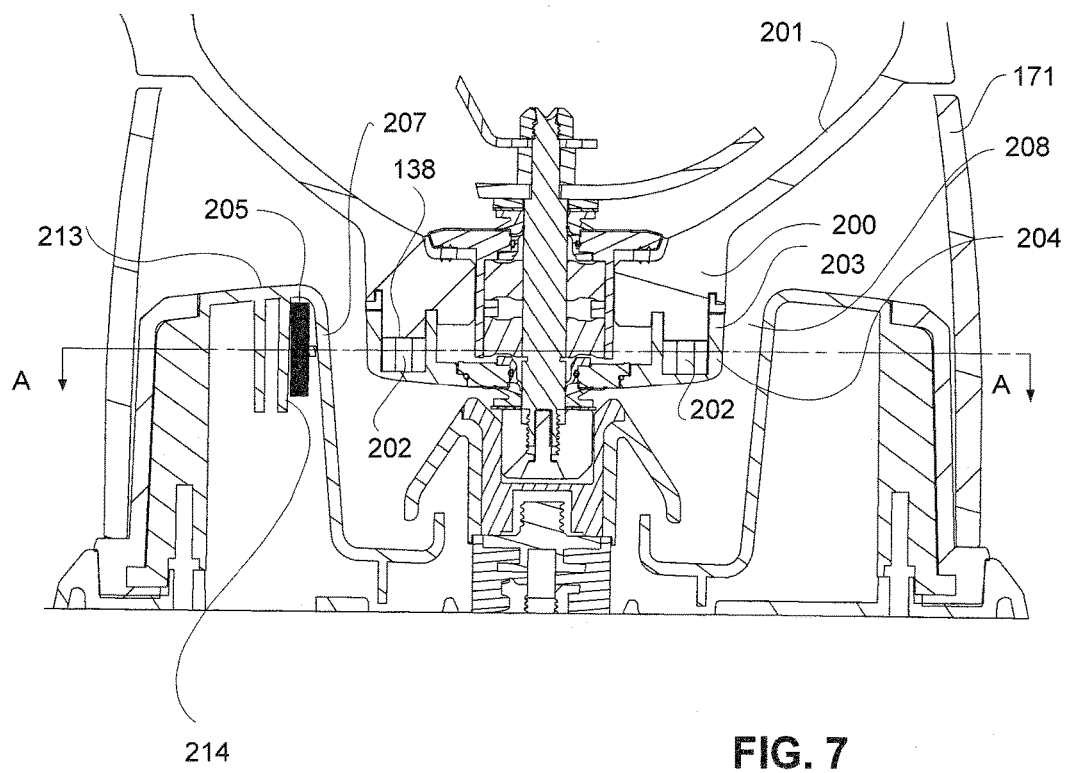
FIG. 7 is a cross sectional view through the collar and neck area of a jug mounted onto a base.
Figure 8:
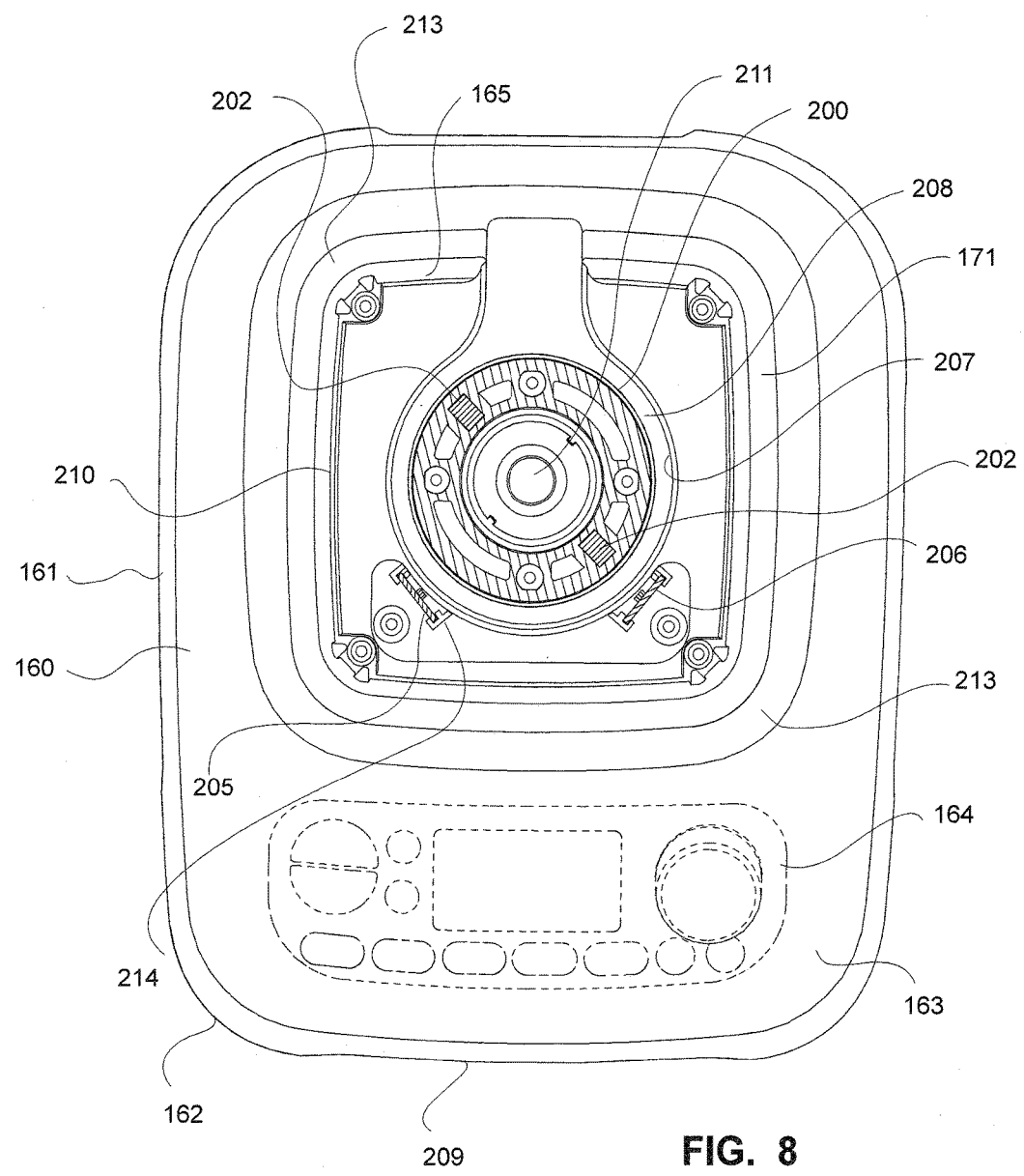
FIG. 8 is a cross section through line A-A of FIG. 7.

Accordingly, and as depicted in FIGS. 7 and 8, the jug's hub 200 carries magnets 202 that cooperate with one or more Hall sensors 205 located adjacent to the throat 208 of the base or neck. In the example depicted in FIGS. 7 and 8, a pair of magnets are carried beneath the hub cover 204, that is, trapped and sealed by the hub cover 204 against an underside or landing 138 formed as an under surface of the hub 200. In this example, the north and south poles of the magnets 202 are oriented in a horizontal plane and in line with the one or more Hall effect sensors 205. In this example, the magnets 202 are provided on opposite sides of the hub, and located on a common diameter of the hub so as to be 180 degrees apart from one another along an imaginary line connecting opposite corners of the generally square collar of the jug. As shown in FIG. 7, the Hall sensor is located immediately adjacent to the side wall of the throat 207. By locating the Hall effect sensor or sensors behind the side will of the throat 207, the throat 207 is free from protrusions that might impede easy cleaning.

As shown more clearly in FIG. 8, the Hall effect sensors 205, 206 are provided as a pair, 90 degrees apart with reference to the centre of rotation 211 of the motor, the male and female couplings and the blade's shaft. In this example, the location of the Hall effect sensors 205, 206 corresponds to the front left and right corners, within the neck 165, preferably adjacent to the upper surface of the neck 213 (see FIGS. 5 and 7). To compliment this arrangement of Hall effect sensors 205, 206, the magnets 202 in the hub 200 are located along a line that connects a pair of opposite corners 212, 213 of the jug's skirt 171. In this way, regardless of how the jug is installed on the base, at least one magnet 202 will be in proximity to one of the Hall effect sensors 205, 206. The Hall effect sensors are of a type that does not require movement of the magnets in order to register the magnets magnetic field. In the example of FIG. 8, the Hall effect sensors 205, 206 are chip mounted and oriented toward the facing pole of an adjacent magnet 202. The sensors 205, 206 are retained by brackets 214 located within the neck 165.

One potential use of the magnets and Hall effect sensors is to provide a safety lock-out. Accordingly, the blender's microprocessor 174 receives signals or information from the Hall effect sensors 205, 206 and prevents power from being supplied to the motor unless one or more of the magnets associated with the hub are detected. Thus, the sliding interconnection between the jug's skirt and the neck, together with the mechanical interconnection between the male and female couplings, working together with the Hall effect sensors and the magnets in the hub provide an accurate indication that the jug is correctly located onto the base.

One of the main advantages of the main or sweeper blades referred to earlier and depicted in FIGS. 1, 2A-2I and 3A-3C is the ability to be used at considerably higher speeds than other main or sweeper blades known in the prior art. Further details will now be provided to the construction of the sweeper blades 17 depicted in FIG. 2I. Typically, main or sweeper blades run at about 10,000 rpm or less. Sweeper blades constructed in accordance with the present invention are capable of speeds in a range or 20-24,000 rpm. Blades operating at these higher speeds must resist unwanted deflection and deformation. Accordingly, they must be strong and rigid but without having excessive weight, particularly at the blade tips. Accordingly, the following construction details have been developed through careful design, observation and testing.

With reference to FIGS. 2I and 9, a three bladed main or sweeper blade component 17, 250 is constructed preferably from stainless steel having a thickness of 2-2.5 mm. The three equally spaced blades are formed on a single blank through which is formed the central opening 251 preferably having flat opposing sides 252 for receiving and restraining the shaft 12. In order to sit correctly onto the shaft and be properly affixed to the blade assembly, the sweeper blades 250 must have a central region that is flat on both the top and bottom surfaces. In this example, the central flat region is approximately circular 253, being concentric with respect to the rotational centre of the shaft, and have a diameter of approximately 19 mm.

It will be understood that this diameter as well as the other measurements provided herein should be taken by way of example and with reference to a blade having an overall tip diameter of approximately 85-90 mm. Each of the three blades in this example are tapered in width, having a maximum width toward the centre and a minimum width at the blade tip. In preferred embodiments, the blades are not twisted. The leading edge 254 of a blade is connected to the trailing edge 255 of an adjacent blade by a smooth transition section 256. In preferred embodiments, the curved transition section 256 lacks any vertical corners or stress concentrating areas. The hub area of the three bladed sweeper blade component is defined by a circle whose maximum radius is defined by that point where the transition section 256 is closest to the centre of the blade 250. The hub area contains the flat region. In this example, the diameter of the hub area is approximately 25.4 mm. Because of the upward curvature of the blades, that portion of the hub area that lies radially outside the flat zone 253 is upwardly curved and thereby strengthened, having a vertical cross sectional thickness that is greater than the thickness of the blank from which the blade is formed (2-2.5 mm). In this example, the bulk of the leading edge 254 of each of the three blades is straight and the trailing edge is swept forward in the direction of blade rotation by about 5 degrees 257.

Each of the three individual blades is said to have a root chord or width 258 that is measured transversely to the longitudinal axis of a blade 259 at a location that corresponds to an inflection point 260. The inflection point 260 is where the smoothly curved transition section 256 changes to the straight line defining the leading edge 254 of a blade. This chord or width at the inflection point 260 is approximately 17.27 mm. Another important chord or width is the chord of the blade at that inflection point along the longitudinal centre line 259 where the blade turns upward 261 into the upturned blade tip 262. The blade tip chord 261 is approximately 6.78 mm. It will be appreciated that when the blade tip chord 261 is too great, the blade tip is too heavy and the blade requires more effort to rotate. Where the chord 261 is too small, the blade lacks effective strength. In plan view, the projected distance between the two chords in this example 258, 261 is approximately 22.56 mm.

The distance between the root chord 258 and the centre line of the blade 250 is approximately 13 mm.

As shown in FIG. 10, each individual blade 270 in the main or sweeper blades curves upwardly. The upward curvature begins radially outward from a point 271 corresponding to the outer perimeter of the blade hub's flat region 253. The blade curvature is smooth and extends upwardly by a distance X that represents the distance from the bottom surface of the main blade 272 to the inflexion point 273 where the upward curvature of the blade tip 274 begins. The distance X is equivalent to about 0.45 times the overall projected length of the blade as measured from the blade's centre line 275 to the outermost point of the blade 276. In some embodiments X may correspond to as little as 0.225 of the projection length Y (seen from above) but is preferably never greater than 0.5 of the overall projected length Y. In preferred embodiments, the height of the blade tip 277 is shown in FIG. 10 as the distance Z as is preferably 2.5 mm or more. It is preferred to have a smooth radius in the transition of the upper surface from the upward curvature of the blade to the upright blade tip 277. In preferred embodiments, the radius of the bend between the upper, curved part of the blade and the blade tip is about 3 mm or more. As shown in FIG. 11, the tip of the blade is bevelled with reference to a horizontal plane, reaching a maximum vertical height at the leading edge 281 and having a reduced height at the trailing edge 282. This bevelling of the tip reduces the mass of the tip.

As shown in FIG. 12, the hub area of the sweeper blade is seen as having an apparent thickness in the vertical direction 290 that exceeds the thickness 291 of the area within the flat region 253. This is owing to the upward curvature of the blade in those areas outside of the generally circular flat region 253. This design principle applies equally to a sweeper blade with two blades, three blades or more than three blades.

As shown in FIGS. 13 and 14 and with reference to a three bladed sweeper blade for a high speed or other motorised blender, the central and essentially circular part of the sweeper blade's hub is circular or generally circular. The upward curvature in the circular or generally circular region of the hub 301 lying radially outward of the flat region 300 forms a bowl or cup shape between the flat region 300 and each of the three blades 302. The upward curvature exists in the area 303 between each of the blades 302 and the flat region 300 and also in that part of the outer zone of the hub area that is between adjacent blades, that is, adjacent to the inflexion point 305 that defines the transition between leading edge 306 and the adjacent trailing edge 307.

As shown in the example of FIG. 15, a sweeper blade 310 in some examples has three individual blades 311. This particular sweeper blade 310 can be thought of as having a hub area 312 comprising all of the areas that are radially inward of the three blades. In this example, the individual blades 311 are defined as being radially outward of the chord 313 that tranverses each blade, perpendicular to the longitudinal axis of the blade 314 at that point where the leading edge 316 of a blade begins to curve toward the trailing edge of an adjacent blade, thereby defining an inflexion point 315. The hub area can thus be thought of as all of the area between each of the three chords 313 and the centre of the sweeper blade 316. In preferred embodiments, all of the surface within the boundary of the three chords 313 is upwardly curved except for the circular of generally circular flat region 320.

As shown in FIG. 16, the principles of a flat region surrounded by an upward curvature forming a bowl are depicted with reference to a two bladed sweeper blade in FIG. 16. In the example of a two bladed sweeper blade, the outer perimeter of the bowl 330 is incorporated into the transition between the leading edge 331 of one blade and the trailing edge 332 of the other individual blade. Thus, an edge comprising both a leading edge 331 and a trailing edge 332 has four inflexion points. A first inflexion point 333 is found where the root area of a leading edge first becomes concave. A second inflexion point 334 is formed where the concavity between a blade and the hub area becomes convex. A third inflexion point is formed where the convex curvature becomes concave again. A further inflexion point 336 is where the curvature of the perimeter of the hub joins the curvature of the trailing edge 332. In this example, bowl shaped hub area 330 includes a central and circular or generally circular flat area 337.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be, with reference to examples, the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

What is claimed is:

1. A blender jug and base apparatus, the apparatus including:
    a blender jug having a jug body with a through opening that retains a hub;
    wherein the hub has a blade assembly and a drive shaft;
    a blender base that drives the blade assembly;
    wherein the blender base has a throat in which is formed a neck; the neck receives the hub;
    a pair of Hall effect sensors are provided, each behind a side wall of the neck;
    wherein the Hall effect sensors are located about 90 degrees apart with respect to the shaft; and
    the hub carries a pair of magnets that are located at about 180 degrees from one another with reference to the shaft, for cooperating with a Hall effect sensors.

2. The apparatus according to claim 1, wherein the magnets have poles that are oriented in a horizontal plane.

3. The apparatus according to claim 1, wherein the neck is generally square, having four corners; and the at least one Hall effect sensor is located in each of two adjacent corners.

4. The apparatus according to claim 3, wherein the magnets are located along a line that intersects opposite corners of the jug.

5. The apparatus according to claim 4, wherein the magnets have poles that are oriented in a horizontal plane.

6. The apparatus according to claim 1, wherein:
    the jug body has a through opening for receiving a blade assembly;
    the blade assembly having a bearing case within which is mounted bearings for supporting the shaft;
    the bearing case has a flange at one end and having threads at an opposite end, the threads protruding from a lower surface of the hub;
    the threads cooperating with a threaded nut that draws the flange into engagement with the jug;
    the lower surface of the hub and the nut being capped by a cover through which protrudes the shaft; and
    a lower end of the shaft having attached to it, a coupling.

7. The apparatus according to claim 6, wherein the pair of magnets are retained beneath the cover.

8. The apparatus according to claim 6, wherein:
    the cover has a first opening that receives an insert with a second opening through which the shaft passes;
    the insert having a lower surface with a metallic covering; and
    a seal interposed between the coupling and the covering, the covering acting as a contact surface for the seal.

9. The apparatus according to claim 8, wherein the covering is at least partially embedded into the insert.

10. The apparatus according to claim 8, wherein a circumferential edge of the insert is stepped to cooperate with a second step formed in the first opening in the cover.

11. The apparatus according to claim 6, wherein the cover is retained onto the hub by vertically oriented fasteners.

12. The apparatus according to claim 6, wherein a seal is interposed between the flange and an interior of the jug.

13. The apparatus according to claim 6, wherein the jug has a collar and an underside of the jug is free from ribs within the collar.

14. The apparatus according to claim 6, the jug having a sweeper blade, wherein:
    a hub area with a central flat region, from which hub area radiates three upwardly curved and tapered individual blades;
    each individual blade having a straight leading edge and a swept trailing edge;
    each individual blade having an upright blade tip; and
    wherein a transition section between a leading edge and an adjacent trailing edge is smoothly curved.

15. The apparatus according to claim 14, wherein the blade is carried on a shaft that passes through a bearing case.

* * * * *